United States Patent
Fischer et al.

(10) Patent No.: US 11,838,409 B2
(45) Date of Patent: Dec. 5, 2023

(54) METHOD AND APPARATUS FOR TRANSFERRING DATA IN A PUBLISH-SUBSCRIBE SYSTEM

(71) Applicant: SIEMENS AKTIENGESELLSCHAFT, Munich (DE)

(72) Inventors: Kai Fischer, Baldham (DE); Steffen Fries, Baldham (DE)

(73) Assignee: Siemens Aktiengesellschaft, Munich (DE)

( * ) Notice: Subject to any disclaimer, the term of this patent is extended or adjusted under 35 U.S.C. 154(b) by 260 days.

(21) Appl. No.: 17/297,235

(22) PCT Filed: Oct. 17, 2019

(86) PCT No.: PCT/EP2019/078173
§ 371 (c)(1),
(2) Date: May 26, 2021

(87) PCT Pub. No.: WO2020/108847
PCT Pub. Date: Jun. 4, 2020

(65) Prior Publication Data
US 2022/0294613 A1 Sep. 15, 2022

(30) Foreign Application Priority Data
Nov. 30, 2018 (EP) ..................................... 18209579

(51) Int. Cl.
*H04L 9/08* (2006.01)
*H04L 9/32* (2006.01)

(52) U.S. Cl.
CPC .......... *H04L 9/0833* (2013.01); *H04L 9/0825* (2013.01); *H04L 9/3255* (2013.01)

(58) Field of Classification Search
CPC .... H04L 9/0833; H04L 9/0825; H04L 9/3255
See application file for complete search history.

(56) References Cited

U.S. PATENT DOCUMENTS

| | | | |
|---|---|---|---|
| 2005/0044356 A1* | 2/2005 | Srivastava | H04L 9/0827 713/163 |
| 2012/0174181 A1* | 7/2012 | Zhang | H04L 9/3247 726/1 |

(Continued)

FOREIGN PATENT DOCUMENTS

| | | | | |
|---|---|---|---|---|
| CN | 106850195 A | * | 6/2017 | ........... H04L 63/065 |
| DE | 102016222523 A1 | | 5/2018 | |

(Continued)

OTHER PUBLICATIONS

PCT International Search Report and Written Opinion of International Searching Authority dated Jan. 22, 2020 corresponding to PCT International Application No. PCT/EP2019/078173.

*Primary Examiner* — Darshan I Dhruv
(74) *Attorney, Agent, or Firm* — Lempia Summerfield Katz LLC

(57) ABSTRACT

The invention relates to a method for transferring data in a publish-subscribe system (100) comprising a key distribution server (200) and a plurality of communication devices (101, 102, 103, 104) which can be coupled to the key distribution server (200) and which comprise at least one server device and a number of client devices. The method comprises the following steps: a) providing (S101) a group key by means of the key distribution server (200) to a group (G) selected from the communication devices (101, 102, 103, 104) to establish group communications, secured by the group key, within the group (G) of selected communication devices (101, 102, 103, 104); b) providing (S102) a point-to-point connection which can be encrypted by means of a public key of an asymmetric encryption, between a first and a second communication device (101, 102) of the group (G); and c) transferring (S103) a message encrypted by means of the public key for the point-to-point connection and secured (Continued)

by means of the group key, between the first and the second communication device (101, 102).

20 Claims, 4 Drawing Sheets

(56) References Cited

U.S. PATENT DOCUMENTS

| | | | |
|---|---|---|---|
| 2013/0142336 A1* | 6/2013 | Fries | H04L 63/123 |
| | | | 380/278 |
| 2015/0195261 A1* | 7/2015 | Gehrmann | H04L 9/0833 |
| | | | 726/7 |
| 2016/0142772 A1* | 5/2016 | Pinder | H04N 7/1675 |
| | | | 725/31 |
| 2018/0063094 A1* | 3/2018 | Albrecht | H04L 9/0833 |
| 2018/0254892 A1* | 9/2018 | Egorov | H04L 9/0891 |
| 2018/0352022 A1* | 12/2018 | Hornquist Astrand | ...... |
| | | | H04L 63/126 |
| 2020/0059357 A1 | 2/2020 | Fries et al. | |

FOREIGN PATENT DOCUMENTS

| | | | |
|---|---|---|---|
| WO | WO-2005106681 A1 * | 11/2005 | G06F 21/10 |
| WO | WO-2016126151 A1 * | 8/2016 | |

\* cited by examiner

METHOD AND APPARATUS FOR TRANSFERRING DATA IN A PUBLISH-SUBSCRIBE SYSTEM

CROSS REFERENCE TO RELATED APPLICATIONS

This present patent document is a § 371 nationalization of PCT Application Serial Number PCT/EP2019/078173 filed on Oct. 17, 2019, designating the United States, which is hereby incorporated in its entirety by reference. This patent document also claims the benefit of EP 18209579.0 filed on Nov. 30, 2018 which is hereby incorporated in its entirety by reference.

FIELD

Embodiments relate to a method and a computer program product for transferring data in a publish-subscribe system.

BACKGROUND

The opening of closed systems to produce open IoT (Internet of Things) systems gives rise to requirements for the communication in industrial networks that are known from the telecommunications scene and the public Internet. The increasing decentralization of the systems means that components are also behind firewall systems and are therefore not directly reachable from the Internet.

This is where so-called publish-subscribe systems are used. Publish-subscribe systems are distinguished in that, conventionally, no dedicated bidirectional communication connection is set up between two terminal communication apparatuses, such as for example a server and a client, but rather the communication takes place in topic-based fashion. In publish-subscribe systems, both conventional point-to-point communication and a group communication may be used in order to reach a multiplicity of systems in as efficient a manner as possible. One example of this is load shedding, connection of decentralized energy resources or else limiting of the power infeed in a smart grid system.

For both the point-to-point communication and for the group communication in a publish-subscribe system, there is this requirement of end-to-end security. For example, the requirement includes ensuring that messages cannot be altered in unauthorized fashion both in the event of group communication between multiple communication apparatuses and in the event of end-to-end communication between two communication apparatuses.

To meet this requirement, various methods are known from the prior art. The prior art for publish-subscribe systems includes for example firstly message-broker-based methods and secondly brokerless-based methods.

With the message-broker-based method, a group communication includes at least one message broker (transmission apparatus) and two or more communication apparatuses. In this case, the message broker is arranged between two or more communication apparatuses within a group communication. The task of the message broker is firstly authentication of the individual communication apparatuses and secondly distribution of, for example, digital certificates to requesting communication apparatuses and also transfer of data to individual communication apparatuses. With this type of communication, the communication apparatuses may subscribe with the message broker for topics and receive the applicable messages when a further communication apparatus publishes a message pertaining to the topic subscribed for to the message broker. With the message-broker-based method, the communication connection between communication apparatuses and message broker is protected by a transport encryption such as TLS, that ensures integrity and confidentiality and also allows authentication of the message broker. A prerequisite in this case is that the message broker has asymmetric key material and an appropriate X.509 certificate for authentication. In message-broker-based methods, it is assumed that the message broker is trusted, at least as far as the acceptance and delivery of data are concerned. However, no end-to-end security is achieved between the communication apparatuses of the group in this case, since it may firstly be that the message broker is not trusted and secondly the first communication apparatus does not know the second communication apparatus, that is a stipulated recipient of a message.

With the brokerless-based method, a group communication includes only the individual communication apparatuses and no message broker. Multicast addresses may include different topics assigned to them. The communication apparatuses interested in a topic are then subscribers to one or more multicast addresses. In this case, protection of the group communication may be achieved by group keys that are distributed to the individual communication apparatuses of the group by a central key distribution server. This allows protection of the messages at least within the group. However, likewise no end-to-end security is achieved between the communication apparatuses of the group, since all communication apparatuses of the group may create, encrypt, modify and decrypt messages.

For example, DE 10 2016 222 523 A1 discloses that topic-specific keys are derived from the distributed group key in a publish-subscribe system so as thereby to form subgroups, that in turn include a subgroup key, in order to increase the security of the end-to-end communication.

US 2013/142336 A1 discloses a method and an apparatus that provide a dedicated group key distribution in systems that use generic object-oriented substation events (GOOSE). The method includes defining a group configuration for the GOOSE system by way of a multiplicity of field devices, checking possession of an asymmetric key pair of each field device in the group and individually distributing a group key to each field group member device through a substation controller by secure interaction between the substation controller and the group member device, and updating the group key after a change to the group configuration.

US 2018/254892 A1 discloses a computer system and a method that allow delegated access to encrypted information for distributed messaging and queue frameworks or generally for publish/subscribe architectures. In these frameworks and architectures, data are published by data producers and organized into channels or queues that consumer applications may subscribe to and that are managed by one or more broker units.

US 2005/044356 A1 discloses an approach for setting up secure multicast communication between multiple multicast proxy service nodes. The multicast proxy service nodes, that may be distributed over a company domain, are organized in a logic tree that emulates the logic tree arrangement of domains in a directory server system. The attributes of the multicast proxy service nodes include the group session keys, that are members of the secure multicast or broadcast groups. Since both keys and key version information are stored in the directory, multicast security may be achieved by way of any number of network domains throughout the company. Key information is stored in a directory service, and the logic tree is supported by the latter. Replication of the directory distributes the keys. Multicast proxy service nodes may retrieve current key information from a local copy of the replicated directory.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments described herein improve the transfer of data in a publish-subscribe system.

Embodiments provide a method for transferring data in a publish-subscribe system including a key distribution server and a plurality of communication apparatuses that may be coupled to the key distribution server, including at least one server apparatus and a number of client apparatuses, is proposed. The method includes the following steps: providing a group key through the key distribution server to a group selected from the communication apparatuses to create a group communication, that is protected by the group key, within the group of selected communication apparatuses, providing a point-to-point connection, that may be encrypted by a public key of an asymmetric encryption, between a first and a second communication apparatus of the group, and transferring a message, that is encrypted for the point-to-point connection by the public key and protected by the group key, between the first and second communication apparatuses.

Transferring a message involves the message being encrypted by the public key and then the encrypted message being protected by the group key. Alternatively, transferring a message may also involve the message being protected by the group key and then the protected message being encrypted by the public key.

The term "protected" relates to the group key having been applied to the message. In addition, "encrypted" relates here and below to the public key having been applied for the point-to-point connection. In the present case, an existing group communication protected by way of the group key involves an asymmetrically encrypted point-to-point connection being created between the first communication apparatus and the second communication apparatus. This forms an end-to-end encryption within the group between the first communication apparatus and the second communication apparatus.

The end-to-end encryption allows a message protected by the group key to be transferred between the first communication apparatus and the second communication apparatus without the protected message being able to be modified and decrypted by other communication apparatuses within the group, or else outside the group. A communication apparatus that wants to transmit a protected message, such as for example the first communication apparatus, may produce the end-to-end encryption only if it is in the same group as a stipulated recipient of the protected message, such as for example the second communication apparatus. Conversely, the stipulated recipient may decrypt the message encrypted by the asymmetrically encrypted point-to-point connection and protected by the group key only if it is also able to decrypt the group encryption beforehand.

The providing of the end-to-end encryption between the first communication apparatus and the second communication apparatus increases the security of the message transfer between at least two communication apparatuses within the group, since manipulation and decryption of the encrypted and protected message by another communication apparatus within the group that does not act as the stipulated recipient are prevented. Increased security is therefore achieved, for example in industrial protocols and in energy automation protocols, through the more efficient use of the existing group communication, that involves the end-to-end encryption being incorporated into the existing group communication while no additional new communication channels are opened within the group.

In the present case, the publish-subscribe system is, for example, a system that includes at least one publisher, that publishes data, and a subscriber, that may subscribe to and receive data. Subscribing may also be understood as including a subscription, for example. Publish-subscribe systems may also be referred to as publication and subscription systems. Data may be published and subscribed to in topic-based fashion. The term topic-based publish-subscribe system is therefore used for example. The topic of the publish-subscribe system is for example a subject or a service of the publish-subscribe system. The topic may also be hierarchically structured, for example by a topic tree, for example Topic 1, Topic 2, Topic 3.

The communication apparatus is, for example, an apparatus that is configured to communicate and interchange data with another communication apparatus. The first communication apparatus is, for example, a server apparatus. The second communication apparatus is, for example, a client apparatus. Similarly, the first communication apparatus may also be in the form of a client apparatus. The second communication apparatus may also be in the form of a server apparatus. For example, the communication apparatuses within the group that do not correspond to the first communication apparatus and the second communication apparatus may be in the form of a server apparatus and/or in the form of a client apparatus in each case.

The group may include at least two communication apparatuses that may transfer a message protected by a common group key.

The group key is, for example, a symmetric cryptographic key. The group key may be used by the communication apparatuses within the group to encrypt and decrypt messages. Each communication apparatus within the group may therefore encrypt and/or decrypt and/or modify a message, for example.

In the present case, for example in the publish-subscribe system, the key distribution server is in the form of a central key distribution server or in the form of a decentralized key distribution server on an intermediate node in the publish-subscribe system. The central key distribution server may provide the group key to the communication apparatuses of the group.

Providing a group key includes for example supplying all communication apparatuses of the group with identical symmetric group keys. So that a requesting communication apparatus receives a symmetric group key from the key distribution server, for example authentication of the requesting communication apparatus is performed on the key distribution server. For example, the messages within the group may therefore be transferred in protected form. The message protected by group keys provides integrity and confidentiality. This type of communication within the group is for example referred to as protected group communication.

The authentication may include cryptographic authentication methods.

Providing a point-to-point connection includes, for example, the providing of key material to the first and second communication apparatuses in order to use the key material to asymmetrically encrypt the point-to-point connection. The asymmetrically encryptable point-to-point connection is, for example, a direct connection between the first and second communication apparatuses. The asymmetrically encryptable point to-point connection may also be an indirect connection between the first communication apparatus and the second communication apparatus that involves another apparatus being arranged between the first and second communication apparatuses.

The transferring of the protected message proceeds, for example, in cryptographically protected fashion. Cryptographically protected transferring may be achieved in this case by a security protocol, such as for example TLS (Transport Layer Security), SSL (Secure Socket Layer), SSH (Secure Shell), IPSec (Internet Protocol Security), that protects the whole data interchange. Alternatively, methods on higher layers of the OSI model may be used, such as for example S/MIME for the exchange of protected e-mails.

In the present case, a message refers to a digital dataset, for example a series of zeros and ones, that are also referred to as bits, including a specific length. The dataset may be arranged within a data frame. A message includes, for example, a payload data portion, such as an executable command, configuration information, status information and/or a query command, and may also include further parts, such as, for example, an integrity check value (ICV) in the form of a digital signature, a hash value or the like.

In the present case, a point-to-point connection that may be encrypted by an asymmetric encryption refers to, for example, a direct and immediate connection that is provided between two communication apparatuses, such as for example the first communication apparatus and the second communication apparatus, within the group within the context of the publish-subscribe system.

For example, the asymmetrically encrypted point-to-point connection and the group key are used to provide an end-to-end encryption between the first and second communication apparatuses within the group that involves for example the first communication apparatus being able to encrypt and exclusively the second communication apparatus being able to decrypt. The asymmetrically encryptable point-to-point connection may also be formed indirectly by way of a further apparatus between the first communication apparatus and the second communication apparatus.

By way of example, the protected message is transferred from the first communication apparatus or the second communication apparatus or a further communication apparatus of the group to all communication apparatuses of the group.

The transferring of the protected message between the first communication apparatus and the second communication apparatus may be performed unidirectionally.

For example, to perform providing a point-to-point connection and transferring a message, the existing communication protocol of the group communication is extended, in order to be able to transfer the encrypted and protected message, by virtue of the communication apparatus intended to transfer being rendered able to see which communication apparatus acts as the stipulated recipient of the encrypted and protected message. In this case, an extension that may be incorporated into the existing communication protocol of the group communication, such as for example OPC-UA, MQTT or XMPP, is proposed, for example.

According to one embodiment, a number Z, where $Z \geq 1$, of certificates including in each case the at least one public key is distributed to the first communication apparatus and/or to the second communication apparatus by the key distribution server.

The certificate is, for example, a digital certificate that includes a public key. By way of example, the digital certificate is formed according to the X.509 standard. The digital certificate contains, for example, digital data that confirm for example properties of persons or objects. The digital certificate may be used to confirm the identity of an owner, such as for example of the second communication apparatus, and to provide integrity and confidentiality of the transferred data by cryptographic methods. Cryptographic methods include for example asymmetric encryption methods and symmetric encryption methods. These include for example RSA (Rivest, Shamir, Adleman), ECDSA (Elliptic Curve Digital Signature Algorithm), AES (Advanced Encryption Standard), including specific operating modes of symmetric algorithms, such as e.g., GMAC (Galois Message Authentication Code), and Diffie-Hellman key exchange.

For example, the key distribution server distributes the group keys and the digital certificates, that include a public key in each case, to the selected communication apparatuses within the group. The digital certificates of the communication apparatuses of the group may also be stored locally on a memory unit, for example, each communication apparatus also having access to the digital certificates of the other communication apparatuses.

The public key may be a cryptographically confirmed key. For example, the public key is not secret. By way of example, the public key is distributed to other communication apparatuses by a key distribution server. The public key may be used to perform for example public operations, for example to encrypt messages or to check digital signatures. This may involve a public key being uniquely assigned to a communication apparatus. The public key is uniquely identified for example by a fingerprint (for example a hash value).

According to an embodiment, the first communication apparatus encrypts the message by the public key of the second communication apparatus, protects the encrypted message by the group key and transfers the protected and encrypted message to the second communication apparatus.

For example, the second communication apparatus subsequently uses its private key to decrypt the protected message encrypted by the public key of the second communication apparatus. The public key and the private key of the second communication apparatus may form a key pair by which an asymmetric encryption of messages is achieved. This has the advantage, for example, that exclusively the communication apparatus to which the public key for encrypting the message is assigned is also able to use its own private key to decrypt the encrypted message again. By way of example, the encrypted message is transferred to all communication apparatuses within the group in a form protected by the group key, and only the communication apparatus, in this case the second communication apparatus, is able to use the private key to decrypt the protected and encrypted message transferred.

The private key of a communication apparatus, such as for example the second communication apparatus, may be used to decrypt the encrypted and protected message or to sign the encrypted and protected message. For example, in contrast to a symmetric encryption method, in which multiple communication apparatuses share a secret key, only one communication apparatus includes the private key for decrypting the encrypted and protected message in the case of asymmetric encryption methods. The private key of a communication apparatus is for example secret. The other communication apparatuses within the group therefore include no information about the secret private key of the communication apparatus.

According to an embodiment, a third communication apparatus of the group is arranged as a transmission apparatus between the first and second communication apparatuses. The message protected by the group key and encrypted by the public key of the second communication apparatus is transmitted from the first communication apparatus to the second communication apparatus via the transmission apparatus.

The transmission apparatus includes the advantage that, in addition to distributing the symmetric group key and the digital certificates, the transmission apparatus is additionally configured to transmit at least one encrypted and protected message to at least one of the communication apparatuses of the group. This does not exclusively allow transmission of encrypted and protected messages just between two communication apparatuses, such as the first communication apparatus and the second communication apparatus, but rather the transmission apparatus may be used to transmit for example encrypted and protected messages to all subscribers or selected communication apparatuses of the group.

The transmission apparatus may be an apparatus for transmitting messages, group keys and digital certificates in a publish-subscribe system and is, for example, in the form of a message broker. Publish-subscribe systems include for example firstly message-broker-based methods and secondly brokerless-based methods.

Subscribers in a message-broker-based publish-subscribe system may subscribe with the message broker for topics and receive the applicable messages when a publisher publishes a message pertaining to this topic by way of the message broker. The message broker includes for example a directory containing the digital certificates, for example also the public key of the communication apparatuses within the group, and may transmit a public key of a communication apparatus, for example, to a requesting communication apparatus. Additionally, the message broker transmits messages encrypted and protected by the group key to the subscribers. Furthermore, the message broker distributes for example the symmetric group key to the selected communication apparatuses within the group. The message broker may also for example check the authenticity of a requesting communication apparatus by a digital signature of the requesting communication apparatus.

With the brokerless-based method, a group communication includes only the individual communication apparatuses and no message broker. Multicast addresses include different topics assigned to them. The communication apparatuses interested in a topic are then subscribers to one or more multicast addresses.

For example, the third communication apparatus may be in the form of an LDAP memory ("Lightweight Directory Access Protocol" repository) in order to provide information about the digital certificates of the communication apparatuses within the group.

The connection from the first communication apparatus to the second communication apparatus via the transmission apparatus corresponds to an indirect point-to-point connection. The encrypted and protected message is therefore transmitted from the first communication apparatus to the second communication apparatus indirectly via the transmission apparatus. This likewise produces an end-to-end encryption.

According to another embodiment, the key distribution server is in the form of part of the transmission apparatus.

For example, the key distribution server may also be formed externally to the transmission apparatus. The key distribution server is for example not part of the group, but rather merely provides the group keys and digital certificates for the selected communication apparatuses within the group. Similarly, it is conceivable for the key distribution server to be in the form of part of the group, for example.

In both cases, authentication of a transmission apparatus and also an authorization check for the request for a group key are performed, for example.

According to another embodiment, the message protected by the group key and encrypted by the public key of the second communication apparatus is signed by a private key of the first communication apparatus to form a digital signature. A data frame containing the protected and encrypted message and also the digital signature is transferred from the first communication apparatus to the second communication apparatus.

This embodiment is used for example for small messages that are to be transferred, where the asymmetric method is used for encryption directly. The asymmetric encryption method used in this instance increases the security of the message transfer. Furthermore, the check on the authentication of a communication apparatus may be performed by an electronic signature, the so-called digital signature, before the message transfer.

In the present case, a digital signature refers to, for example, a digital signature method in which a transmitter, for example the first communication apparatus, uses its private key to sign the encrypted and protected message. The signing includes the calculation of a value, that is for example part of the encrypted and protected message and/or is appended to the encrypted and protected message. This value is referred to as "digital signature", for example. This value may be used by a recipient, for example the second communication apparatus, to check the authenticity of the first communication apparatus and the integrity of the encrypted and protected message by the public key of the first communication apparatus.

A data frame includes a dataset or a plurality of datasets that include the encrypted and protected message and additional data, such as for example the digital signature and/or other security-related data, and for example are transferred between the first communication apparatus and the second communication apparatus and/or between the message broker and at least one of the communication apparatuses of the group and/or between an address and at least one of the communication apparatuses of the group.

A data frame includes for example an identifier (ID, identification) of one or more communication apparatuses that receive the encrypted and protected message, for example a Diffie-Hellman parameter of the transmitting communication apparatus, the key length of the individual keys, the size of the data frame, a unique descriptor for a key derivative, such as for example HKDF (Hashed Message Authentication Code (HMAC)-based key derivation function), PBKDF2 (Password Based Key Derivation Function), or hash algorithms such as SHA-256, a further unique descriptor for the algorithm for protecting the transferred data within the data frame, an initialization vector for the algorithm, the encrypted and protected message and a check value for checking the integrity of the encrypted and protected message. Other information and datasets within the data frame are conceivable.

For example, the encrypted and protected message that is to be transferred or that is transferred within the data frame contains public and private (secret) components. The public components of the encrypted and protected message may be read by the communication apparatuses of the group to which the encrypted and protected message is transferred. The private components may be read exclusively by the communication apparatus that acts as stipulated recipient of the encrypted and protected message. An example of a public component is the header component of the publish-subscribe system, that all communication apparatuses within the group have. Examples of the private component are the peer-to-peer information and the security information.

According to an embodiment, the message protected by the group key is encrypted by the first communication apparatus using a secret generated by the first communication apparatus and the secret is encrypted by the first communication apparatus by the public key of the second communication apparatus. A data frame containing the protected message encrypted by the secret and also the secret encrypted by the public key of the second communication apparatus is transferred from the first communication apparatus to the second communication apparatus.

This embodiment is used for example for messages that are to be transferred that include large volumes of data. The generated secret is for example a symmetric key. A symmetric key may be used to encrypt and decrypt a protected message, for example.

Use of the symmetric key for encrypting the protected message includes the advantage that the volumes of data are reduced, in comparison with a pure asymmetric encryption in which a public key is used to encrypt the protected message. This reduction in the data to be asymmetrically encrypted allows the speed of the encryption of the message with end-to-end protection to be increased.

According to an embodiment, the message protected by the group key and encrypted by the secret is additionally signed by the first communication apparatus by a private key to form a digital signature. The data frame additionally containing the digital signature is transferred from the first communication apparatus to the second communication apparatus.

According to another embodiment, a key table including a number G, where G≥1, of secrets is generated by the first communication apparatus. The first communication apparatus uses a secret from the number G of secrets to encrypt the message protected by the group key and encrypts the secret by the public key of the second communication apparatus and uses a private key of the first communication apparatus to sign the encrypted secret to form a digital signature. A data frame containing the protected message encrypted by the secret, the digital signature and also the secret encrypted by the public key of the second communication apparatus is transferred from the first communication apparatus to the second communication apparatus.

The key table includes a number G, where G≥1, of secrets. The secret is for example in the form of a symmetric key.

Each symmetric key of the key table includes a unique descriptor, for example. By way of example, the first communication apparatus encrypts the protected message using the symmetric key from a "row 8" of the key table. For example, the unique descriptor "row 8" is encrypted by the public key of the second communication apparatus. The protected message encrypted by the symmetric key and the unique descriptor of the symmetric key, that is encrypted by the public key, are then transferred within the data frame to the second communication apparatus. Subsequently, the second communication apparatus uses its private key to decrypt the unique descriptor and then receives information about which symmetric key in which "row" is used for encryption. For example, the second communication apparatus may then use the received symmetric key from "row 8" to decrypt the encrypted and protected message.

According to an embodiment, the first communication apparatus uses the public key of the second communication apparatus as a stipulated key component and generates an independent key component. A further secret including a combination of the stipulated key component and the independent key component is calculated by the first communication apparatus and the further secret is used to encrypt the protected message. A data frame containing the protected and encrypted message and also the independent key component is transferred from the first communication apparatus to the second communication apparatus.

The further secret is for example a symmetric key, for example a symmetric key as the result of a Diffie-Hellman key negotiation.

In the present case, the stipulated key component including the, for example, public key of the second communication apparatus is, for example, a stipulated and public Diffie-Hellman key component. In the present case, the independent key component is for example the private Diffie-Hellman key component. The combination of the public and private key components is used to form the symmetric Diffie-Hellman key that is used to encrypt the protected message.

According to an embodiment, the message protected by the group key and encrypted by the further secret is additionally signed by a private key of the first communication apparatus to form a digital signature. The data frame additionally containing the digital signature is transferred from the first communication apparatus to the second communication apparatus.

According to an embodiment, a number N of messages protected by the group key, where N≥2, is transferred bidirectionally and/or unidirectionally between the first and second communication apparatuses via the provided encrypted point-to-point connection.

For example, the transferring of protected messages between the third communication apparatus and/or the first communication apparatus and/or the second communication apparatus is performed bidirectionally and/or unidirectionally.

According to an embodiment, a key table including a number G, where G≥2, of secrets is generated by the first communication apparatus. Each of the secrets from the number G of secrets is assigned a specific designation. The first communication apparatus uses a first of the secrets to encrypt a first message protected by the group key and uses a second of the secrets to encrypt a second message protected by the group key. The key table is encrypted by the first communication apparatus by the public key of the second communication apparatus. The first communication apparatus signs the encrypted key table to form a digital signature. A data frame containing the protected first message encrypted by the first secret, the protected second message encrypted by the second secret, the key table encrypted by the public key, the digital signature and also the specific designation for at least the first and second secrets is transferred from the first communication apparatus to the second communication apparatus.

The secret is, for example, a symmetric key. Each of the symmetric keys is assigned a unique descriptor. A multiplicity of protected messages may then be encrypted by the symmetric keys. By way of example, a first message receives the symmetric key from "row 8", a second message receives the symmetric key from "row 2" and a third message receives the symmetric key from "row 7". As a result, each message is assigned a unique descriptor that may subsequently be used by the second communication apparatus to decrypt the respective message.

According to an embodiment, the first communication apparatus uses the public key of the second communication apparatus as a stipulated key component and generates an independent key component. A further secret including a combination of the stipulated key component and the independent key component is calculated by the first communication apparatus and the further secret is stored by the first communication apparatus. Specific keys for the number N of messages protected by the group key are derived from the further secret by a key derivation function to encrypt the messages. A data frame containing the number N of protected and encrypted messages and the specific keys and also the independent key component is transferred from the first communication apparatus to the second communication apparatus. The second communication apparatus stores the further secret.

According to an embodiment, a separate communication channel is set up between two communication apparatuses in order to implement an asymmetrically encrypted point-to-point connection outside the group.

Embodiments also provide a computer program product that prompts the performance of the method as outlined above on a program-controlled device is proposed.

A computer program product, such as e.g., a computer program, may be provided or delivered for example as a storage medium, such as e.g., a memory card, a USB stick, a CD-ROM, a DVD, a Blu-Ray, or else in the form of a downloadable file from a server in a network. This may be accomplished for example in a wireless communication network through the transfer of an appropriate file containing the computer program product or the computer program.

Embodiments also provide an apparatus for transferring data in a publish-subscribe system including a key distribution server and a plurality of communication apparatuses that may be coupled to the key distribution server, including at least one server apparatus and a number of client apparatuses, is proposed. The apparatus includes: a first providing unit that is configured to provide a group key through the key distribution server to a group selected from the communication apparatuses to create a group communication, that is protected by the group key, within the group of selected communication apparatuses, a second providing unit that is configured to provide a point-to-point connection, that may be encrypted by a public key of an asymmetric encryption, between a first and a second communication apparatus of the group, and a transfer unit that is configured to transfer a message, that is encrypted for the point-to-point connection by the public key and protected by the group key, between the first and second communication apparatuses via the provided encrypted point-to-point connection.

The respective unit, for example the providing unit or the transfer unit, may be implemented in hardware and/or else in software. When implemented in hardware, the respective unit may be in the form of an apparatus or in the form of part of an apparatus, for example in the form of a computer or in the form of a microprocessor or in the form of a control computer of a vehicle. When implemented in software, the respective unit may be in the form of a computer program product, in the form of a function, in the form of a routine, in the form of part of a program code or in the form of an executable object.

The embodiments and features described for the proposed apparatus apply to the proposed method accordingly.

Embodiments also provide a publish-subscribe system that includes at least one key distribution server and a plurality of communication apparatuses that may be coupled to the key distribution server and at least one apparatus according to the third aspect is proposed.

Other possible implementations also encompass combinations not explicitly mentioned of features or embodiments described above or below in respect of the embodiments. In this case, a person skilled in the art will also add individual aspects as improvements or supplementations to the respective basic form of the method.

DETAILED DESCRIPTION

Figure 1:
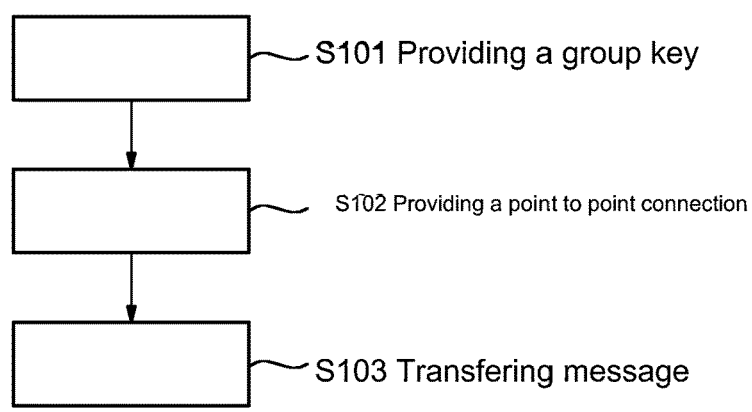
FIG. 1 depicts a schematic flowchart for an embodiment of a method for transferring data in a publish-subscribe system.
Figure 2:
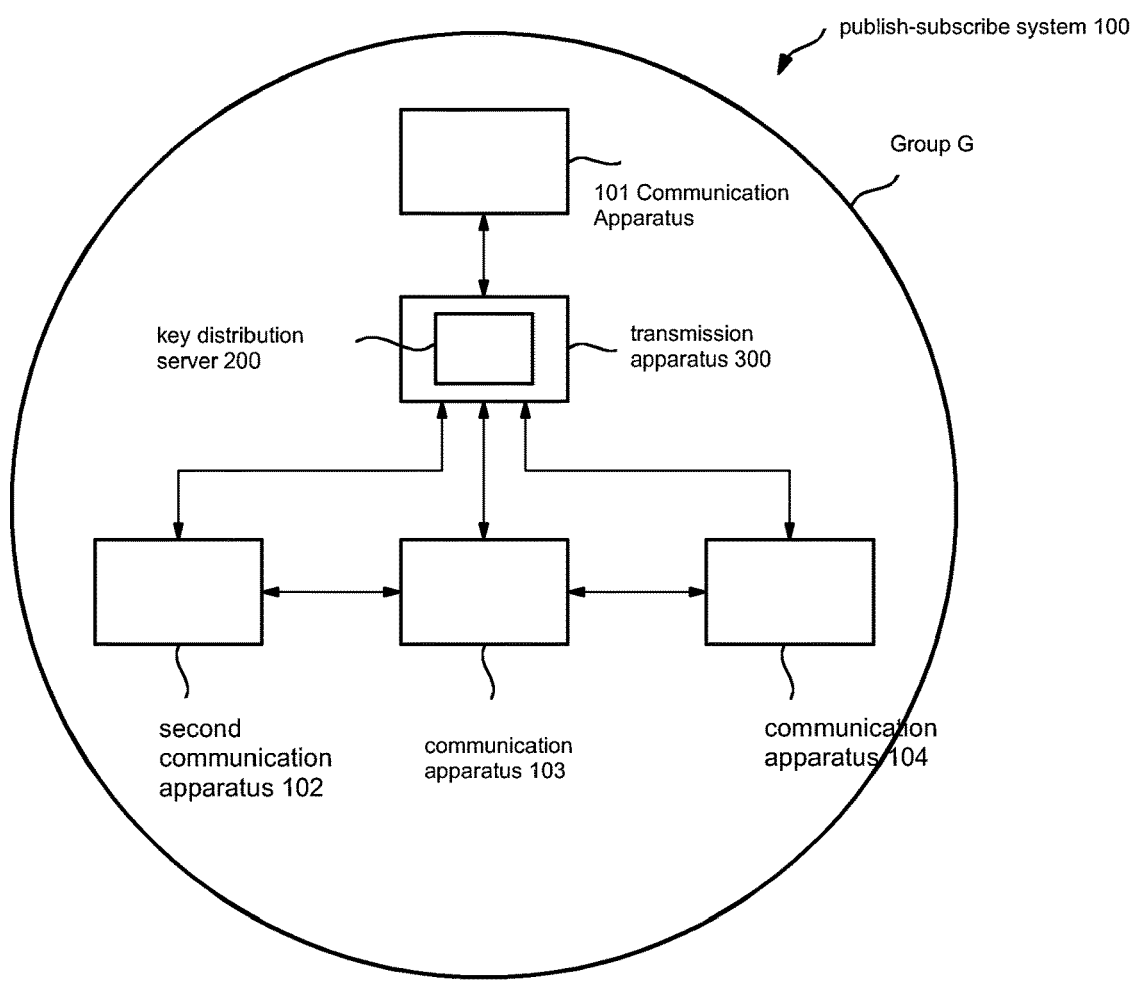
FIG. 2 depicts a schematic block diagram of an embodiment of a publish-subscribe system for transferring data having a transmission apparatus and communication apparatuses.

FIG. 1 depicts a schematic flowchart for an embodiment of a method for transferring data in a publish-subscribe system 100. In this regard, FIG. 2 depicts a schematic block diagram of an embodiment of the publish-subscribe system 100 for transferring data. The publish-subscribe system 100 includes a transmission apparatus 300 and a group G including communication apparatuses 101 to 104. The communication apparatus 101 is for example referred to as first communication apparatus, while the communication apparatus 102 is referred to as second communication apparatus. The transmission apparatus 300 is for example in the form of a third communication apparatus within the group G and is arranged between the first and second communication apparatuses 101, 102. In this case, the message protected by the group key and encrypted by the public key of the second communication apparatus 102 is transmitted from the first communication apparatus 101 to the second communication apparatus 102 via the transmission apparatus 300.

Additionally, there is provision for a key distribution server 200, that is in the form of part of the transmission apparatus 300 in the example in FIG. 2.

The embodiment in FIG. 1 includes the following method steps S101 to S103:

In step S101, a group key is provided by the key distribution server 200 to the group G selected from the communication apparatuses 101, 102, 103, 104 to create a group communication, that is protected by the group key, within the group G of selected communication apparatuses 101, 102, 103, 104.

For example, a number Z, where Z≥1, of certificates including in each case the at least one public key is distributed to the first communication apparatus 101 and to the second communication apparatus 102 by the key distribution server 200.

In step S102, a point-to-point connection, that may be encrypted by a public key of an asymmetric encryption, is provided between the first and second communication apparatuses 101, 102 of group G.

In step S103, a message, that is encrypted for the point-to-point connection by the public key and protected by the group key, is transferred between the first and second communication apparatuses 101, 102.

The first communication apparatus 101 encrypts the message by the public key of the second communication apparatus 102, protects the encrypted message by the group key and transfers the protected and encrypted message to the second communication apparatus 102.

For example, the message protected by the group key and encrypted by the public key of the second communication apparatus 102 is signed by a private key of the first communication apparatus 101 to form a digital signature. A data frame containing the protected and encrypted message and also the digital signature is subsequently transferred from the first communication apparatus 101 to the second communication apparatus 102.

The message protected by the group key may be encrypted by the first communication apparatus 101 using a secret generated by the first communication apparatus 101 and the secret is encrypted by the first communication apparatus 101 by the public key of the second communication apparatus 102. A data frame containing the protected message encrypted by the secret and also the secret encrypted by the public key of the second communication apparatus is then transferred from the first communication apparatus 101 to the second communication apparatus 102.

For example, the message protected by the group key and encrypted by the secret is additionally signed by the first communication apparatus 101 by a private key to form a digital signature. Subsequently, the data frame additionally containing the digital signature is transferred from the first communication apparatus 101 to the second communication apparatus 102.

A key table including a number G, where G≥1, of secrets is generated by the first communication apparatus 101. In this case, the first communication apparatus 101 uses a secret from the number G of secrets to encrypt the message protected by the group key and encrypts the secret by the public key of the second communication apparatus 102 and uses a private key of the first communication apparatus 101 to sign the encrypted secret to form a digital signature. A data frame containing the protected message encrypted by the secret, the digital signature and also the secret encrypted by the public key of the second communication apparatus 102 is then transferred from the first communication apparatus 101 to the second communication apparatus 102.

The first communication apparatus 101 for example uses the public key of the second communication apparatus 102 as a stipulated key component and generates an independent key component. A further secret including a combination of the stipulated key component and the independent key component is calculated by the first communication apparatus 101 and the further secret is used to encrypt the protected message. Next, a data frame containing the protected and encrypted message and also the independent key component is transferred from the first communication apparatus 101 to the second communication apparatus 102.

The message protected by the group key and encrypted by the further secret may be additionally signed by a private key of the first communication apparatus 101 to form a digital signature. After that, the data frame additionally containing the digital signature is transferred from the first communication apparatus 101 to the second communication apparatus 102.

For example, a number N of messages protected by the group key, where N≥2, is transferred bidirectionally and/or unidirectionally between the first and second communication apparatuses 101, 102 via the provided encrypted point-to-point connection.

A key table including a number G, where G≥2, of secrets is generated by the first communication apparatus 101. Each of the secrets from the number G of secrets is for example assigned a specific designation. The first communication apparatus 101 uses a first of the secrets to encrypt a first message protected by the group key and uses a second of the secrets to encrypt a second message protected by the group key. The key table is for example encrypted by the first communication apparatus 101 by the public key of the second communication apparatus 102. Additionally, the first communication apparatus 101 signs the encrypted key table to form a digital signature. Subsequently, a data frame containing the protected first message encrypted by the first secret, the protected second message encrypted by the second secret, the key table encrypted by the public key, the digital signature and also the specific designation for at least the first and second secrets is transferred from the first communication apparatus 101 to the second communication apparatus 102.

The first communication apparatus 101 for example uses the public key of the second communication apparatus 102 as a stipulated key component and generates an independent key component. A further secret including a combination of the stipulated key component and the independent key component is calculated by the first communication apparatus 101 and the further secret is stored by the first communication apparatus 101. Furthermore, specific keys for the number N of messages protected by the group key are derived from the further secret by a key derivation function to encrypt the messages. A data frame containing the number N of protected and encrypted messages and the specific keys and also the independent key component is subsequently transferred from the first communication apparatus 101 to the second communication apparatus 102. For example, the second communication apparatus 102 stores the further secret.

Figure 3:
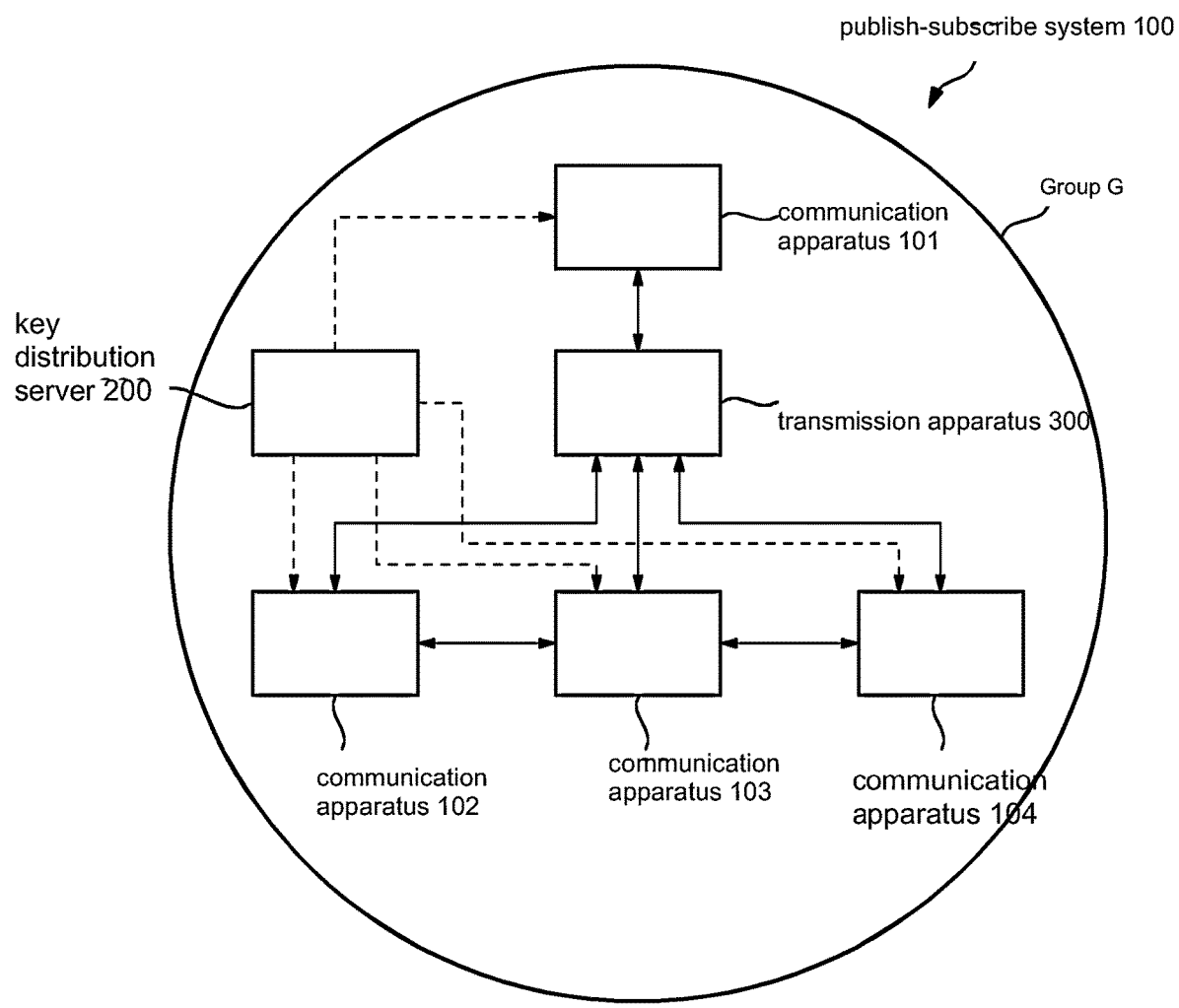
FIG. 3 depicts a schematic block diagram of an embodiment of a publish-subscribe system for transferring data having a transmission apparatus, a key distribution server and communication apparatuses.

FIG. 3 depicts a schematic block diagram of an embodiment of a publish-subscribe system 100 for transferring data having a transmission apparatus 300, a key distribution server 200 and communication apparatuses 101 to 104. In comparison with the publish-subscribe system 100 of FIG. 2, the key distribution server 200 is formed outside the transmission apparatus 300 in FIG. 3.

Figure 4:
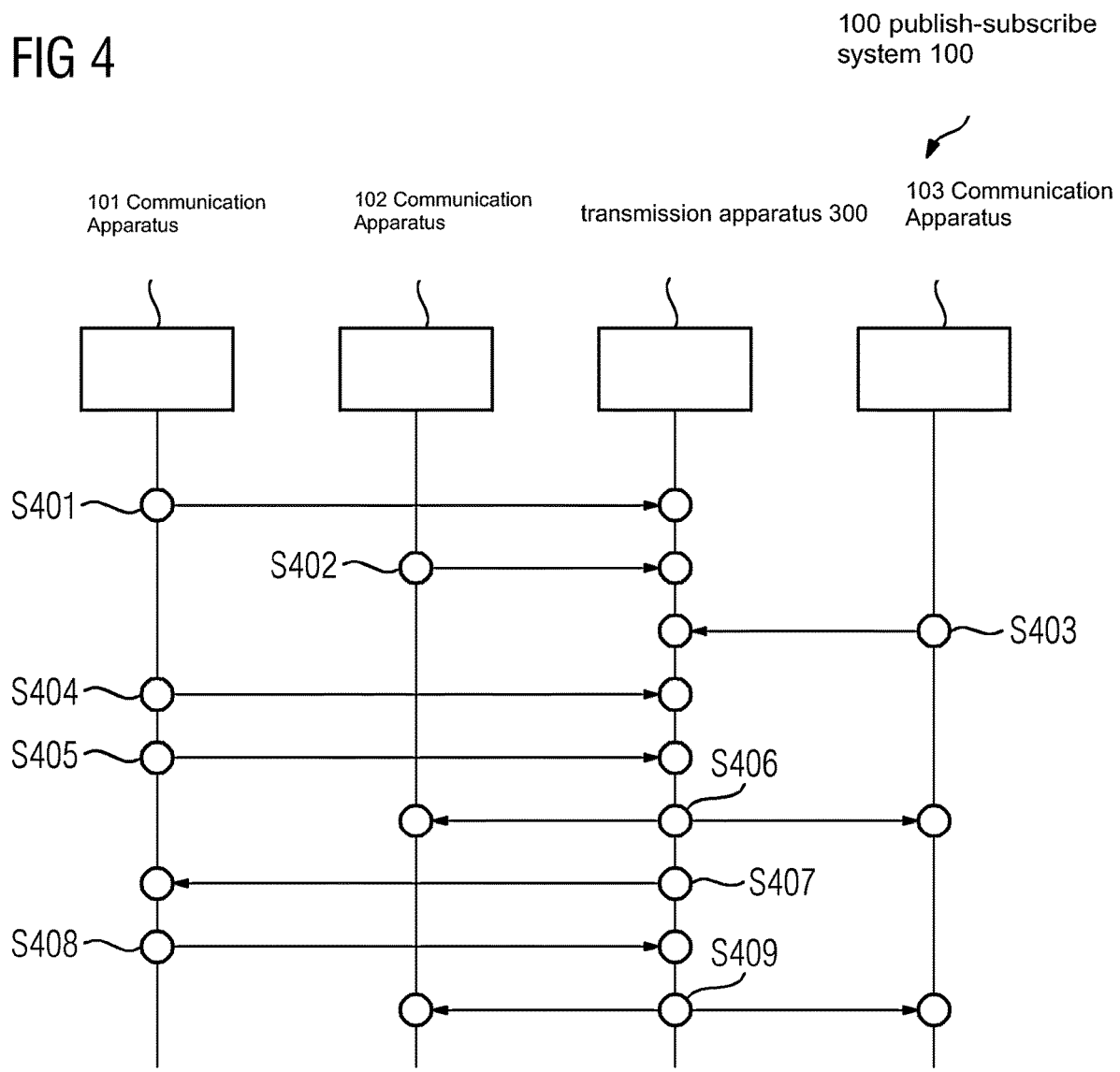
FIG. 4 depicts a schematic flowchart for an embodiment of a method for transferring at least one message between the first communication apparatus and at least the second communication apparatus by a transmission apparatus within a publish-subscribe system.

FIG. 4 depicts a schematic flowchart for an embodiment of a method for transferring at least one message between the first communication apparatus 101 and at least the second communication apparatus 102 by a transmission apparatus 300 within a publish-subscribe system 100. Additionally, the publish-subscribe system 100 includes a further communication apparatus 103. The first communication apparatus 101 is for example in the form of a server apparatus. The second communication apparatus 102 and the further communication apparatus 103 may be in the form of client apparatuses. Additionally, the transmission apparatus 300 is in the form of a message broker, for example. The publish-subscribe system 100 from FIG. 4 may be topic-based. For example, the first communication apparatus 101 is in the form of a publisher, while the second communication apparatus 102 and the further communication apparatus 103 are in the form of subscribers.

The embodiment of FIG. 4 includes the following method steps S401 to S409:

In step S401, a topic, such as for example "Measurement Sensor_ID", is published to the transmission apparatus 300 by the first communication apparatus 101. The transmission apparatus 300 for example includes a public list of contents for the communication apparatuses 102, 103 within the group G. The topics that the transmission apparatus 300 receives from the first communication apparatus 101 or further server apparatuses are visible to the communication apparatuses 102, 103 by the list of contents.

In steps S402 and S403, each of the communication apparatuses 102, 103 subscribes with the transmission apparatus 300. The communication apparatuses 102, 103 are informed about all messages that are published with the transmission apparatus 300 by way of the topic "Measurement Sensor_ID" by the first communication apparatus 101.

In step S404, the first communication apparatus 101 fetches information about which communication apparatuses 102, 103 have subscribed to the topic "Measurement Sensor_ID". Since the second communication apparatus 102 and the further communication apparatus 103 have subscribed, but the second communication apparatus 102 acts as stipulated recipient, the first communication apparatus 101, for example the server apparatus, queries the digital certificate of the second communication apparatus 102 in order to obtain the public key of the second communication apparatus 102 to later encrypt the protected message. This is, for example, because only the transmission apparatus 300 and/or a key distribution server, not depicted, has the digital certificates of the communication apparatuses 102, 103 to date.

In step S405, the first communication apparatus 101 publishes a new value, the value "Value", to the transmission apparatus 300 for the topic "Measurement Sensor_ID". This may be a measured value from a sensor with the sensor_ID.

In step S406, the transmission apparatus 300 then informs the subscribers, that is to say the second communication apparatus 102 and the further communication apparatus 103, that the first communication apparatus 101 has published a new value under the topic "Measurement Sensor_ID". However, the transmission apparatus 300 still receives no information regarding how accurately the new value "Value" is formed.

In step S407, the first communication apparatus 101, following successful authentication on the transmission apparatus 300, receives the digital certificate of the second communication apparatus 102 that was requested in step S404, and therefore the public key thereof. Subsequently, the first communication apparatus 101 encrypts the component of the message containing the public key of the second communication apparatus 102 that the second communication apparatus 102 is permitted to read, that is to say the value "Value".

In step S408, the first communication apparatus 101 publishes the message encrypted by the public key of the second communication apparatus 102 and protected by the group key to the transmission apparatus 300.

In step S409, the transmission apparatus 300 subsequently transfers the encrypted and protected message to all subscribers, for example to the second communication apparatus 102 and the further communication apparatus 103. Each of the communication apparatuses 102, 103 subscribed to the topic "Measurement Sensor_ID" within the group G may receive the encrypted and protected message. However, only the second communication apparatus 102 may use its private key to decrypt the component of the encrypted and protected message that contains the value "Value", since the encrypted and protected message was previously encrypted by the public key of the second communication apparatus 102. The further communication apparatus 103 is unable to decrypt the encrypted and protected message. An end-to-end encryption is therefore realized when transferring an encrypted and protected message within the group between the first communication apparatus 101 and the second communication apparatus 102.

In the event of a key table with symmetric keys being used and multiple messages being transferred between the first communication apparatus 101 and the second communication apparatus 102, the schematic flowchart from FIG. 4 is performed as follows:

Steps S401 to S407 are identical to the steps explained above.

In step S408, the first communication apparatus 101 encrypts the message protected by the group key that contains the value "Value" using one of the symmetric keys from the key table generated by the first communication apparatus 101. The key table in turn is encrypted by the public key of the second communication apparatus 102. Subsequently, the first communication apparatus 101 sends the encrypted and protected message and the encrypted key table with a unique descriptor of the symmetric key used to the transmission apparatus 300.

In step S409, the second communication apparatus 102 receives the encrypted and protected message and the encrypted key table with the unique descriptor of the symmetric key used. The second communication apparatus 102 may then use the private key to decrypt the encrypted key table and may then use the unique descriptor to use the symmetric key from the table, which key may be used to decrypt the encrypted and protected message. When a new message is transferred, the method proceeds analogously. Another symmetric key is used for the new message.

Figure 5:
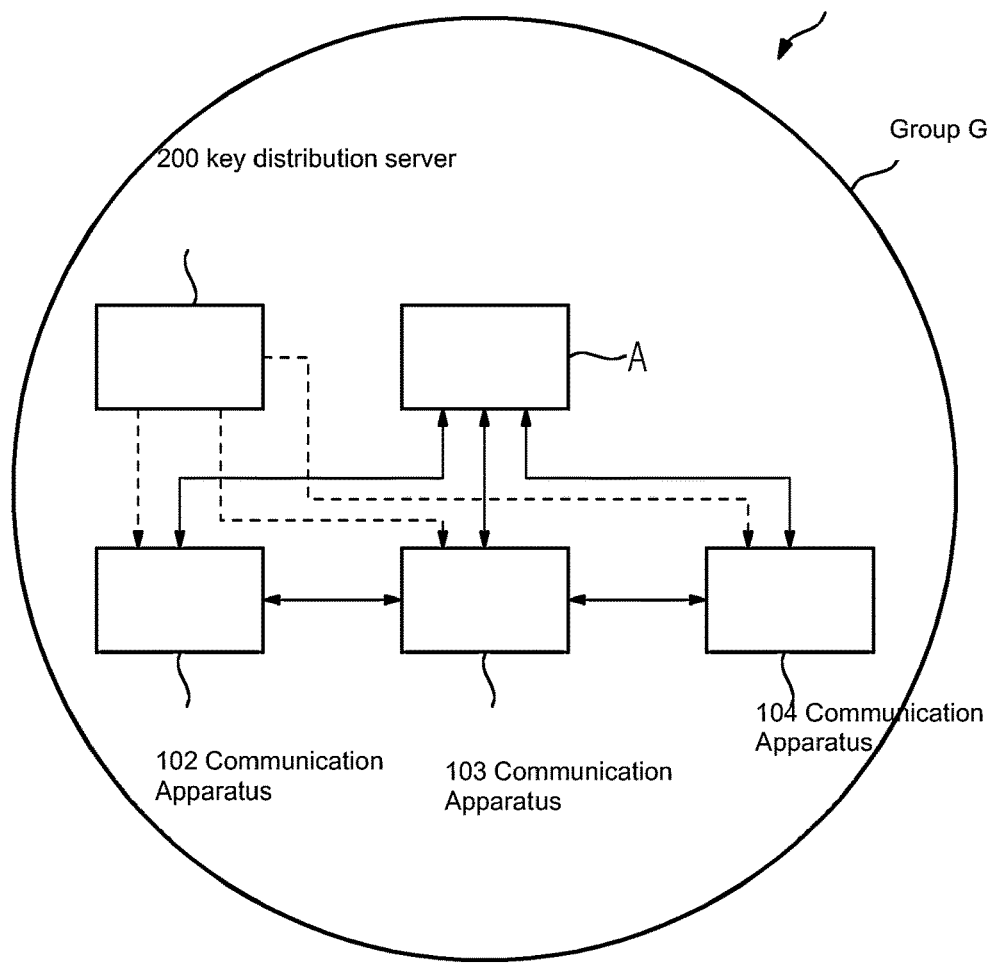
FIG. 5 depicts a schematic block diagram of an embodiment of a publish subscribe system for transferring data having a key distribution server and communication apparatuses.

FIG. 5 depicts a schematic block diagram of an embodiment of a publish-subscribe system 100 for transferring data including a key distribution server 200 and communication apparatuses 102, 103, 104.

In this case, the key distribution of the group keys within the group G is realized by way of a key distribution server 200. The protected message to be transferred is transferred to an address A. The communication apparatuses 102, 103, 104 that want to receive the protected message may subscribe at the address A.

Figure 6:
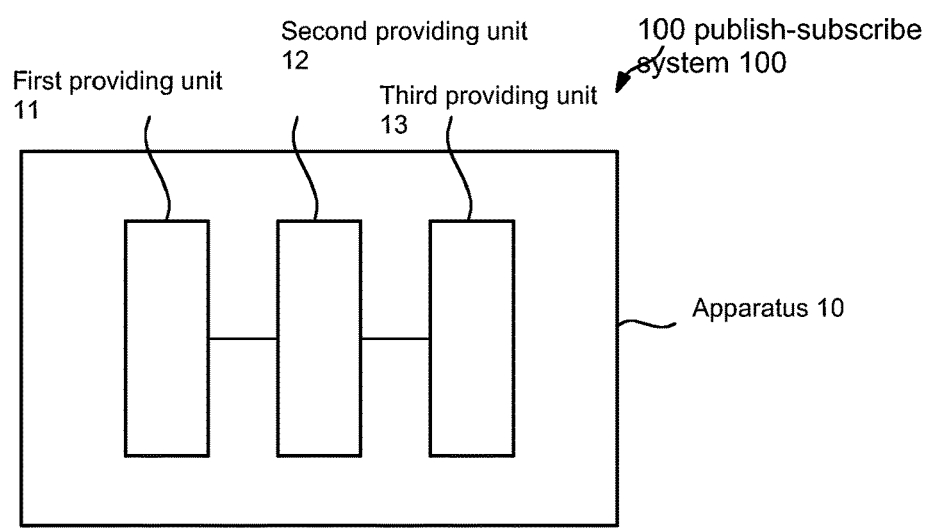
FIG. 6 depicts a schematic block diagram of an embodiment of an apparatus for transferring data in a publish-subscribe system.

FIG. 6 depicts a schematic block diagram of an embodiment of an apparatus 10 for transferring data in a publish-subscribe system 100. An example of the publish-subscribe system 100 is shown in FIG. 2. The apparatus 10 includes a first providing unit 11, a second providing unit 12 and a transfer unit 13.

The first providing unit 11 is configured to provide a group key through the key distribution server 200 to a group G selected from the communication apparatuses 101, 102, 103, 104 to create a group communication, that is protected by the group key, within the group G of selected communication apparatuses 101, 102, 103, 104.

The second providing unit 12 is configured to provide a point-to-point connection, that may be encrypted by a public key of an asymmetric encryption, between a first and a second communication apparatus 101, 102 of the group G.

The transfer unit 13 is configured to transfer a message, that is encrypted for the point-to-point connection by the public key and protected by the group key, between the first and second communication apparatuses 101, 102.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for transferring data in a publish-subscribe system comprising a key distribution server and a plurality of communication apparatuses that are configured to couple to the key distribution server, the plurality of communication apparatuses comprising at least one server apparatus and at least one client apparatus, the method comprising:
providing a group key through the key distribution server to a group selected from the plurality of communication apparatuses to create a group that is protected by the group key;
providing a point-to-point connection that is encrypted by a public key of an asymmetric encryption, between a first communication apparatus and a second communication apparatus of the group; and
transferring a message, that is encrypted for the point-to-point connection by the public key and protected by applying the group key to the message, between the first communication apparatus and second communication apparatuses.

2. The method of claim 1, wherein one or more certificates comprising in each case the public key is distributed to the first communication apparatus, to the second communication apparatus, or to the first communication apparatus and the second communication apparatus by the key distribution server.

3. The method of claim 1, wherein the first communication apparatus encrypts the message by the public key of the second communication apparatus, protects the encrypted message by the group key, and transfers the protected and encrypted message to the second communication apparatus.

4. The method of claim 3, wherein a third communication apparatus of the group is configured as a transmission apparatus between the first communication apparatus and the second communication apparatus, wherein the message protected by the group key and encrypted by the public key of the second communication apparatus is transmitted from the first communication apparatus to the second communication apparatus via the transmission apparatus.

5. The method of claim 4, wherein the key distribution server is configured as part of the transmission apparatus.

6. The method of claim 3, wherein the message protected by the group key and encrypted by the public key of the second communication apparatus is signed by a private key of the first communication apparatus to form a digital signature, wherein a data frame containing the protected and encrypted message and the digital signature is transferred from the first communication apparatus to the second communication apparatus.

7. The method of claim 1, wherein the message protected by the group key is encrypted by the first communication apparatus using a secret generated by the first communication apparatus and the secret is encrypted by the first communication apparatus by the public key of the second communication apparatus, wherein a data frame containing the protected message encrypted by the secret and also the secret encrypted by the public key of the second communication apparatus is transferred from the first communication apparatus to the second communication apparatus.

8. The method of claim 7, wherein the message protected by the group key and encrypted by the secret is additionally signed by the first communication apparatus by a private key to form a digital signature, wherein the data frame additionally containing the digital signature is transferred from the first communication apparatus to the second communication apparatus.

9. The method of claim 1, wherein a key table comprising one or more secrets is generated by the first communication apparatus, wherein the first communication apparatus uses a secret from the one or more secrets to encrypt the message protected by the group key and encrypts the secret by the public key of the second communication apparatus and uses a private key of the first communication apparatus to sign the encrypted secret to form a digital signature, wherein a data frame containing the protected message encrypted by the secret, the digital signature and the secret encrypted by the public key of the second communication apparatus is transferred from the first communication apparatus to the second communication apparatus.

10. The method of claim 1, wherein the first communication apparatus uses the public key of the second communication apparatus as a stipulated key component and generates an independent key component, wherein a further secret comprising a combination of the stipulated key component and the independent key component is calculated by the first communication apparatus and the further secret is used to encrypt the protected message, wherein a data frame containing the protected and encrypted message and the independent key component is transferred from the first communication apparatus to the second communication apparatus.

11. The method of claim 10, wherein the message protected by the group key and encrypted by the further secret is additionally signed by a private key of the first communication apparatus to form a digital signature, wherein the data frame additionally containing the digital signature is transferred from the first communication apparatus to the second communication apparatus.

12. The method of claim 1, wherein two or more messages protected by the group key are transferred bidirectionally or unidirectionally between the first communication apparatus and the second communication apparatus via the provided encrypted point-to-point connection.

13. The method of claim 12, wherein a key table comprising two or more secrets is generated by the first communication apparatus, wherein each of the secrets from the two or more secrets is assigned a specific designation, wherein the first communication apparatus uses a first of the two or more secrets to encrypt a first message protected by the group key and uses a second of the two or more secrets to encrypt a second message protected by the group key, wherein the key table is encrypted by the first communication apparatus by the public key of the second communication apparatus, wherein the first communication apparatus signs the encrypted key table to form a digital signature, wherein a data frame containing the protected first message encrypted by the first secret, the protected second message encrypted by the second secret, the key table encrypted by the public key, the digital signature and also the specific designation for at least the first and second secrets is transferred from the first communication apparatus to the second communication apparatus.

14. The method of claim 12, characterized in that the first communication apparatus uses the public key of the second communication apparatus as a stipulated key component and generates an independent key component, wherein a further secret comprising a combination of the stipulated key component and the independent key component is calculated by the first communication apparatus and the further secret is stored by the first communication apparatus, wherein specific keys for the two or more of messages protected by the group key are derived from the further secret by a key derivation function to encrypt the messages, wherein a data frame containing the two or more protected and encrypted messages and the specific keys and also the independent key component is transferred from the first communication apparatus to the second communication apparatus, wherein the second communication apparatus stores the further secret.

15. An apparatus for transferring data in a publish-subscribe system comprising a key distribution server and a plurality of communication apparatuses that are configured to couple to the key distribution server, the apparatus comprising:
a first providing unit comprising a first microprocessor that is configured to provide a group key through the key distribution server to a group selected from the communication apparatuses that is protected by the group key;
a second providing unit comprising a second microprocessor that is configured to provide a point-to-point connection, that is encrypted by a public key of an asymmetric encryption, between a first communication apparatus and a second communication apparatus of the group; and
a transfer unit comprising a third microprocessor that is configured to transfer a message, that is encrypted for the point-to-point connection by the public key and protected by applying the group key to the message, between the first communication apparatus and the second communication apparatuses.

16. The apparatus of claim 15, wherein one or more certificates comprising in each case the public key is distributed to the first communication apparatus, to the second communication apparatus, or to the first communication apparatus and the second communication apparatus by the key distribution server.

17. The apparatus of claim 15, wherein the first communication apparatus encrypts the message by the public key of the second communication apparatus, protects the encrypted message by the group key, and transfers the protected and encrypted message to the second communication apparatus.

18. The apparatus of claim 17, wherein a third communication apparatus of the group is configured as a transmission apparatus, comprising a fourth microprocessor, between the first and second communication apparatuses, wherein the message protected by the group key and encrypted by the public key of the second communication apparatus is transmitted from the first communication apparatus to the second communication apparatus via the transmission apparatus.

19. The apparatus of claim 18, wherein the key distribution server is configured as part of the transmission apparatus.

20. The apparatus of claim 18, wherein the message protected by the group key and encrypted by the public key of the second communication apparatus is signed by a private key of the first communication apparatus to form a digital signature, wherein a data frame containing the protected and encrypted message and the digital signature is transferred from the first communication apparatus to the second communication apparatus.

* * * * *